United States Patent
Marten

(10) Patent No.: US 10,770,057 B1
(45) Date of Patent: Sep. 8, 2020

(54) SYSTEMS AND METHODS FOR NOISE CANCELATION IN A LISTENING AREA

(71) Applicant: DISH Network L.L.C., Englewood, CO (US)

(72) Inventor: Neil Marten, Lakewood, CO (US)

(73) Assignee: DISH NETWORK, L.L.C., Englewood, CO (US)

( * ) Notice: Subject to any disclaimer, the term of this patent is extended or adjusted under 35 U.S.C. 154(b) by 0 days.

(21) Appl. No.: 16/547,400

(22) Filed: Aug. 21, 2019

(51) Int. Cl.
  H04M 1/00   (2006.01)
  G10K 11/178  (2006.01)
  H04M 1/60   (2006.01)

(52) U.S. Cl.
  CPC ..... *G10K 11/17823* (2018.01); *H04M 1/6008* (2013.01); *G10K 2210/108* (2013.01); *G10K 2210/3011* (2013.01); *G10K 2210/3044* (2013.01)

(58) Field of Classification Search
  CPC ... G10K 2210/3051; G10K 2210/3014; G10K 11/17823; G10K 2210/108; G10K 2210/3044; H04M 1/6058; H04M 1/6033; H04M 1/6008
  See application file for complete search history.

(56) References Cited

U.S. PATENT DOCUMENTS

2010/0014682 A1* 1/2010 Shin ............... H03G 3/3026
                                     381/57
2018/0181812 A1* 6/2018 Dimitriadis ........ G06K 9/00684

* cited by examiner

*Primary Examiner* — Nhan T Le
(74) *Attorney, Agent, or Firm* — Seed IP Law Group LLP

(57) ABSTRACT

Systems and methods for noise cancelation in a listening area include functionality that activates a microphone of the remote control device of a home entertainment system or a microphone of another mobile device to collect a baseline white noise profile of a user's media content listening area, such as the user's family room, living room or other TV viewing space. This baseline white noise profile may be used by the user's set-top box (STB) or other receiving device to generate the corresponding noise canceling audio signal to create a noise-canceling effect and a more immersive and enjoyable listening experience for the user. A plurality of audio data samples from which to select, each representing a different baseline profile of ambient white noise associated with the media content listening area, may be generated and used for different devices that generate white noise.

16 Claims, 7 Drawing Sheets

SYSTEMS AND METHODS FOR NOISE CANCELATION IN A LISTENING AREA

TECHNICAL FIELD

The technical field relates to noise cancelation, and particularly to noise cancelation in a listening area.

BRIEF SUMMARY

A noise-canceling system may use a microphone of a remote control device of the home entertainment system or a microphone of another mobile device to collect a baseline white noise profile of a user's media content listening area, such as the user's family room, living room or other TV viewing space. This baseline white noise profile may be used by the user's set-top box (STB) or other receiving device to generate the corresponding noise canceling audio signal in order to create a noise-canceling effect and a more immersive and enjoyable listening experience for the user. A plurality of audio data samples each representing a different baseline profile of ambient white noise associated with the media content listening area may be generated for different devices, such as home appliances, that are not on all the time, and thus are not generating noise all the time. The user may select which audio data sample to use when playing an event or allow the system to check (i.e., automatically poll) the audio in the room or corresponding listening area at random or periodic intervals (e.g., in some cases, upon user approval) to automatically select the audio data sample with the baseline profile that is the closest match to the sample received from the automatic polling of the listening area.

A method for noise cancelation may comprise receiving, by at least one computer processor, a plurality of audio data samples each representing a different baseline profile of ambient white noise associated with a media content listening area within a building. After receiving the plurality of audio data samples, each representing a different baseline profile of ambient white noise, the system may output, by the at least one computer processor, programming including media content for presentation to a listener of the media content in the media content listening area within the building. The system may then output, by the at least one computer processor, while outputting the programming, an audio signal based on a selected audio data sample of the plurality of received audio data samples to cancel ambient white noise for the listener of the media content in the media content listening area within the building.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

DETAILED DESCRIPTION

Ambient white noise from home appliances such as dishwashers, refrigerators and air conditioners often distracts from listening to television (TV) programming or other media. Noise cancelation can be implemented to cancel out or reduce such ambient white noise to improve the listening experience. Noise cancelation works by taking as input ambient sounds via a microphone and adding an inverted sound wave to the audio being output by the system, resulting in cancelling out the ambient white noise that is interfering with the audio of the programming. In some embodiments, the system may generate a noise-cancelling audio wave that is 180° out of phase with the ambient white noise in order to cancel out the ambient white noise.

However, it is often unfeasible, impractical and/or wastes resources for the system to continuously sample and analyze the ambient white noise in order to generate a corresponding noise cancelation audio wave. Thus, the noise-canceling system disclosed herein ingeniously uses a microphone of the remote control device of the home entertainment system or a microphone of another mobile device to collect a baseline white noise profile of a user's media content listening area, such as the user's family room, living room or other TV viewing space. This baseline white noise profile may be used by the user's STB or other receiving device to generate the corresponding noise canceling audio signal to create a noise-canceling effect and a more immersive, enjoyable listening experience for the user.

A plurality of audio data samples each representing a different baseline profile of ambient white noise associated with the media content listening area may be generated for different devices, such as home appliances, that are not on all the time, and thus are not generating noise all the time. The user may select which audio data sample to use when playing an event or allow the system to check (i.e., automatically poll) the audio in the room or corresponding listening area at random or periodic intervals (e.g., in some cases, upon user approval) to automatically select the audio data sample with the baseline profile that is the closest match to the sample received from the automatic polling of the listening area. For example, if the system is set to automatically poll the listening area, the remote control microphone may take an audio sample, remove the known audio of the programming that the system is outputting at that time and then check the remaining audio signal against the known baseline profiles of ambient white noise it has for the listening area associated with the previously collected plurality of audio data samples. The system may then switch to using the previously collected audio data sample having the closest matching baseline profile of ambient white noise to cancel out most or all of the other sounds.

Figure 1:
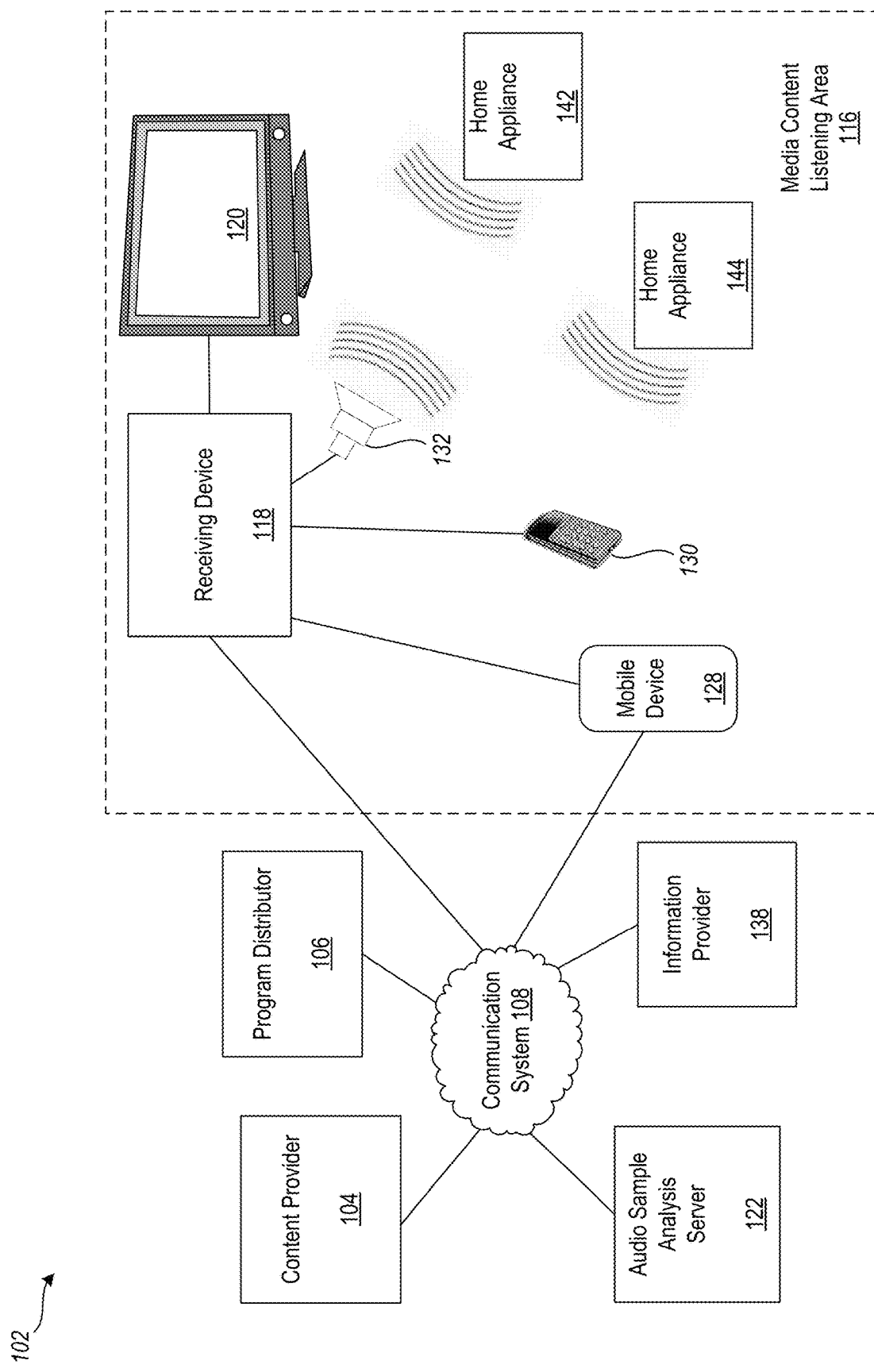
FIG. 1 is an overview block diagram illustrating a technical environment in which embodiments of systems and methods for noise cancelation in a listening area may be implemented, according to an example embodiment.

FIG. 1 is an overview block diagram illustrating a technical environment 102 in which embodiments of systems and methods for noise cancelation in a listening area may be implemented, according to an example embodiment.

Before providing additional details regarding the operation and constitution of methods and systems for noise cancelation in a listening area, the example technical environment 102, within which such a system may operate, will briefly be described.

In the technical environment 102, audio, video, and/or data service providers, such as television service providers, provide their customers a multitude of video and/or data programming (herein, collectively "programming" or "content"). Such programming is often provided by use of a receiving device 118 communicatively coupled to a presentation device 120 configured to receive the programming. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

In one embodiment, the receiving device 118 is a device such as a set-top box, television, DVR, DVD player, PC, tablet device, game machine, smart phone, mobile device or other computing device or media player configured to receive programming via a connection to a satellite or cable television service provider outside the media content listening area 116 and to display such programming on a presentation device 120. For example, the receiving device 118 may be configured to receive, process and display on the presentation device 120 programming received directly from the satellite or cable television service provider, such as cable or satellite television broadcasts via various physical and logical channels of communication of communication system 108. Also, the receiving device 118 may be configured to receive, process and display on the presentation device 120 streaming media content received directly from the satellite or cable television service provider and/or other content provider 104.

The receiving device 118 interconnects to one or more communications media or sources. For example, the various media content may be delivered as data using the Internet Protocol (IP) suite over a packet-switched network such as the Internet or other packet-switched network, which may be included as part of the communication system 108. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. Also, in some embodiments, the presentation device 120 may also be a receiving device 118 or have a receiving device 118 integrated within it. The receiving device 132 also includes, or is operably coupled directly or indirectly to, and may control one or more speakers 132 that outputs audio of media content (such as received programming) and/or an audio signal generated by the receiving device 118 to cancel ambient white noise for the listener of the media content in the media content listening area 116. For example, such white noise may be generated by various home appliances, such as home appliance 142 and/or home appliance 144. Examples of home appliances that may generate ambient white noise include, but are not limited to: kitchen appliances, refrigerators, freezers, dishwashers, washing machines, heating, ventilation and air conditioning (HVAC) systems, fans, washing machines, computers, monitors, light bulbs, lighting systems, etc.

Examples of a receiving device 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," "gaming console" and/or "television tuner," etc. Accordingly, the receiving device 118 may be any suitable converter device or electronic equipment that is operable to receive programming via a connection to a satellite or cable television service provider outside the media content listening area and communicate that programming to another device over a network. Further, the receiving device 118 may itself include user interface devices, such as buttons or switches. In some example embodiments, the receiving device 118 may be configured to receive and decrypt content and/or software or firmware updates according to various digital rights management (DRM) and other access control technologies and architectures as part of or in addition to the process of noise cancelation in a listening area, which will be described in further detail below.

Examples of a presentation device 120 may include, but are not limited to, one or a combination of the following: a television ("TV"), a personal computer ("PC"), a sound system receiver, a digital video recorder ("DVR"), a compact disk ("CD") device, DVD Player, game system, tablet device, smart phone, mobile device or other computing device or media player, and the like. Presentation devices 120 employ a display, one or more speakers, and/or other output devices to communicate video and/or audio content to a user. In many implementations, one or more presentation devices 120 reside in or near a media content listening area 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

In many embodiments, a remote-control device (remote) 130 is operable to control the receiving device 118 and/or the presentation device 124. The remote 130 typically communicates with the receiving device 118 using a suitable wireless medium, such as infrared (IR), radio frequency (RF), or the like. The remote 130 may include a microphone that may be voice or audio activated in order to receive a plurality of audio data samples each representing a different baseline profile of ambient white noise associated with a media content listening area 116. Such audio samples may be recorded and stored by the remote 130 and/or communicated to the receiving device 118 for further processing and analysis. In some embodiments, the remote 130 may be a voice-enabled remote and the same microphone may also be used to receive voice commands from the user and transmit corresponding commands to the receiving device 118.

In the example embodiment shown in FIG. 1, handheld mobile device 128 may be communicatively connected to the television receiving device 118 via a physical or a peer-to-peer short range wireless connection. For example, mobile device 128 may be a handheld mobile device of a user (e.g., a television service provider technician or customer), such as a smartphone, tablet device or other computing or communications device. There may be fewer or additional mobile devices in various embodiments. The mobile device 128 may communicate over communication system 108 with the television receiving device 118, program distributor 106, content provider 104, audio sample analysis server 122 and/or information provider 138 using the transmission control protocol/Internet protocol (TCP/IP) suite of networking communication protocols. In the present example, a cable or satellite television service provider may encompass or be in communication with some or all of the content provider 104, program distributor 106, audio sample analysis server 122, and information provider 138.

In particular, a content provider 104 provides program content, such as television content, to a distributor, such as the program distributor 106. Example program distributors include, but are not limited to, satellite and cable television service providers. Example content providers include television stations which provide local or national television programming and special content providers which provide premium based programming, streaming services, pay-per-view programming and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of: satellite systems, cable systems, fiber optic systems, microwave systems, asynchronous transfer mode ("ATM") systems, frame relay systems, digital subscriber line ("DSL") systems, radio frequency ("RF") systems, telephone systems, cellular systems, and the Internet.

In at least one embodiment, the received program content is converted by the program distributor 106 into a suitable signal (a "program signal") that is ultimately communicated to the receiving device 118. Various embodiments of the receiving device 118 may receive programming from program distributors 106 and/or directly from content providers 104 via locally broadcast radio, RF signals, cable, fiber optic, Internet media, or the like via the communication system 108.

For example, Video on Demand (VOD) systems may allow a user of the receiving device 118 to select, watch and/or listen to video and audio content on demand. For example "Internet Television" and "Internet Protocol Television" (IPTV) are systems through which various media content is delivered using the Internet IP suite over a packet-switched network such as the Internet represented by communication system 108 to the receiving device 118, instead of being delivered through traditional channels using terrestrial, satellite signal, and cable television formats of the communication system 108. In various example embodiments, such technologies are deployed within the environment 102 such as in subscriber-based telecommunications networks of the communication system 108 with high-speed access channels into the media content listening area 116 via the receiving device 118 (e.g., a set-top box or other customer-premises equipment) to bring VOD services to the media content listening area 116.

In various example embodiments, television VOD systems stream media content via the communications system 108 from files stored at a content storage system of a content delivery network operably coupled to the communication system 108, under direct or indirect control of the program distributor 106, to the receiving device 118. Television VOD systems may stream content to a receiving device 118 such as a set-top box, DVD player, game system, smart phone, television (including a smart TV), PC, a sound system receiver, a digital video recorder ("DVR"), a compact disk ("CD") device, tablet device, mobile device or other computing device or media player, and the like, allowing viewing in real time at the media content listening area 116, or downloading to a receiving device 118 such as a computer, DVR (also called a personal video recorder) or portable media player for viewing at any time.

In some embodiments, the receiving device 118 may be a set-top box that is typically provided by the cable provider, satellite provider, or other program distributor 106 to which the customer may subscribe to receive such television services and that also receives programming through traditional channels using a terrestrial, satellite signal, and/or cable television format. The mobile device 128 in communication with the receiving device 118 may be provided by the program distributor, such as a cable provider or satellite provider. However, in some instances, such mobile devices may be devices other than those provided by the program distributor 106. For example, these may include various user devices such as a tablet device, game machine, smart phone, mobile device or other computing device or media player or communications device not provided by or controlled by the cable provider, satellite provider, or other program distributor to which the customer subscribes for the television services.

The audio sample analysis server 122 is operably coupled to the communication system 108 and may be a system of an entity that provides analysis and/or selection of collected audio samples collected by the mobile device 128, receiving device 118 and/or remote 130, each audio sample representing a different baseline profile of ambient white noise associated with the media content listening area 116. For example, for each audio data sample of the plurality of audio data samples, the audio sample analysis server 122 may compare the received sample of audio to the baseline profile of the ambient white noise associated with the media content listening area 116 represented by received audio data sample to determine common characteristics between the received sample of audio and the baseline profile of the ambient white noise associated with the media content listening area 116.

The audio sample analysis server 122 may then communicate to the receiving device 118 results of such audio sample analysis and/or the selection of the applicable baseline profile of the ambient white noise associated with the media content listening area 116 to use in noise cancelation of the ambient white noise by the receiving device 118 within the media content listening area 116. The environment 102 may include many systems associated with a television service provider, such as the program distributor 106, that operate in a manner such as the audio sample analysis server 122 described herein, and the audio sample analysis server 122 represents one or more of such systems in various embodiments. Such functionality may also or instead be performed by the mobile device 128 and/or remote control device 130.

In addition, information provider 138 may provide various forms of content and/or services to various devices residing in the media content listening area 116. For example, information provider 138 may also or instead provide information to the receiving device 118 regarding software and/or firmware updates for the receiving device 118, other receiving devices of a particular television service provider, such as program distributor 106, and/or other additional audio samples and/or metadata regarding such audio data samples or baseline audio profiles of particular types, brands, models and/or manufacturers of various appliances that generate ambient white noise in the media content listening area 116. In this manner, such audio data samples or baseline audio profiles may be used by the receiving device 118 to cancel the ambient white noise of such appliances.

The above description of the environment 102, the media content listening area 116, and the various devices therein, is intended as a broad, non-limiting overview of an example environment in which various embodiments of noise cancelation in a listening area may be implemented. FIG. 1 illustrates just one example of an environment 102 and the various embodiments discussed herein are not limited to such environments. In particular, environment 102 and the various devices therein, may contain other devices, systems and/or media not specifically described herein. The environment 102 may include many different audio sample analysis servers, content providers, program distributors and information providers that operate in a corresponding manner as the audio sample analysis server 122, the content provider 104, program distributor 106 and information provider 138 as described herein. Each of audio sample analysis server 122, the content provider 104, program distributor 106 and information provider 138 may represent one or more of such systems in various embodiments.

Example embodiments described herein provide applications, tools, data structures and other support to implement updating of television receiving devices. Other embodiments of the described techniques may be used for other purposes, including noise cancelation in a listening area not only during initial installation, but during subsequent service calls to the media content listening area 116. Also, such noise cancelation may be performed by various other devices, such as audio and DVD players, digital recorders, computers, peripherals, televisions, mobile devices, active speakers, headphones, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
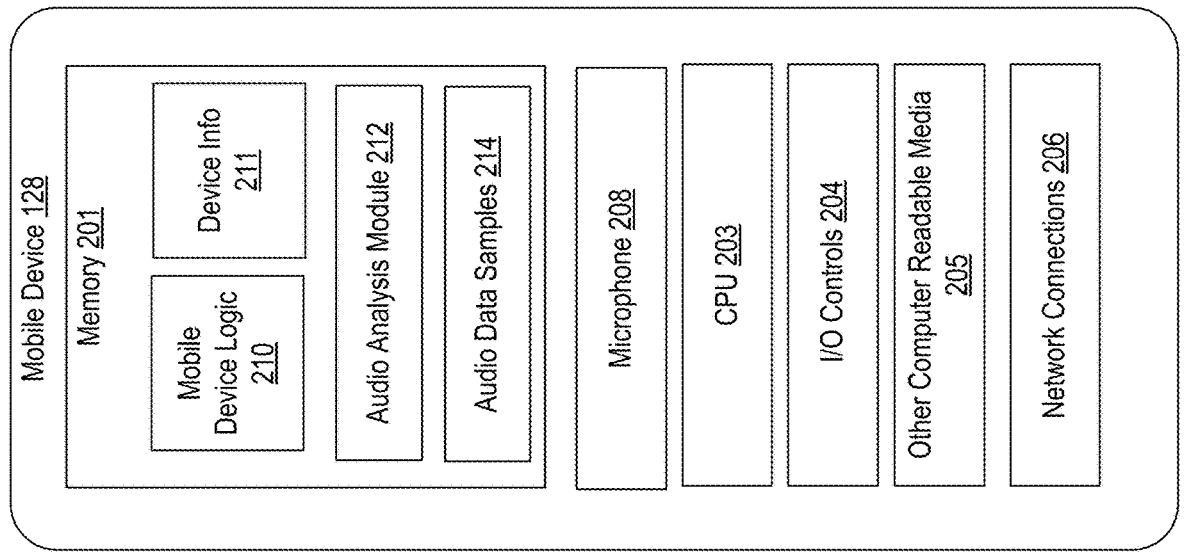
FIG. 2 is a block diagram illustrating elements of an example handheld mobile device used in systems and methods for noise cancelation in a listening area, according to an example embodiment.

FIG. 2 is a block diagram illustrating elements of an example handheld mobile device 128 used in systems and methods for noise cancelation in a listening area, according to an example embodiment.

Some or all of the components, modules and functionality of the mobile device 128 described herein may also or instead be included as part of, and/or be performed by, the remote control 130. For example, the components and functionality of the mobile device 128 associated with the collection and analysis of audio samples for noise cancelation may be included as part of and/or be performed by the remote control 130. The mobile device 128 may be a wireless handheld mobile device of a user (e.g., a television service provider technician or customer), such as a smartphone, tablet device or other mobile computing or communications device. In one embodiment, mobile device 128 comprises a computer memory ("memory") 201 and one or more Central Processing Units ("CPU") 203. Also included are input/output "I/O" controls 204, including, but not limited to: buttons, virtual buttons, switches, keypads, keyboards, touchpads, touchscreens, display screens, liquid crystal displays, speakers, scroll wheel inputs, optical sensors, gesture sensors, accelerometers, motion control sensors, voice command sensors, microphones, trackballs and/or joysticks, etc. Microphone 208 may be a part of the I/O controls 204, or a separate microphone that collects a baseline white noise profile of a user's media content listening area, such as the user's family room, living room or other TV viewing space. This baseline white noise profile may be used by the receiving device 118 to generate the corresponding noise canceling audio signal to create a noise-canceling effect and a more immersive, better listening experience for the user. The mobile device 128 may also include other computer-readable media 205 (e.g., flash memory, SIM card) and network connections 206. The I/O controls 204 may include various different numbers and configurations of controls in various embodiments, including those with touch screen buttons and other input controls.

The network connections 206 include one or more communication interfaces to the receiving device 118, various other mobile devices, computing devices and media devices, including but not limited to, radio frequency (RF) transceivers, cellular communication interfaces and antennas, USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like. The one or more Central Processing Units ("CPU") 203 may be communicatively coupled to the memory 201, the microphone 208 and the I/O controls 204, other computer-readable media 205 and network connections 206, (e.g., via a communications bus) in a manner to control one or more operations of those various components.

The mobile device 128 may communicate with receiving device 118 (directly or via communication system 108), the audio sample analysis server 122, content provider 104, program distributor 106, and/or information provider 138, and possibly other devices (not shown). Mobile device logic 210, device information 211, audio analysis module 212 and audio data samples 214 are shown residing in memory 201. In other embodiments, some portion of the device information 211 and some of, or all of, the components of the logic 210, audio analysis module 212 and audio data samples 214 may be stored on the other computer-readable media 205. For example, the audio data samples collected by the mobile device 128 may be stored on memory 201 and/or other computer-readable media 205. The logic 210 and audio analysis module 212 preferably execute on one or more CPUs 203 and manage operation of the mobile device 128 to perform the techniques described herein. The logic 210 may comprise or implement a system control module as executed by one or more CPUs 203 that are communicatively coupled to the I/O controls 204, microphone 208 and other components of the mobile device 128. Other code or programs and potentially other data/information (not shown), may also reside in the memory 201, and may execute on one or more CPUs 203. Of note, one or more of the components in FIG. 2 may not be present in any specific implementation. For example, some embodiments may not provide other computer readable media 205.

The logic 210 and audio analysis module 212 perform the core functions of the mobile device 128, as discussed herein and also with respect to FIGS. 3 through 7. In particular, the logic 210 reads input that results from activation of I/O controls 204 on the mobile device 128 by the user and performs the function corresponding to the input, including communicating with the receiving device 118, sending commands to various devices and performing internal operations of the mobile device 128. For example, the logic 210 and audio analysis module 212, when executed on one or more CPUs 203, may perform or cause the following to be performed: activate the microphone 208 to initiate collection of a plurality of audio data samples as samples of audio present in a media content listening area within a building, each audio data sample of the plurality of audio data samples representing a different baseline profile of ambient white noise associated with the media content listening area within the building; receive, from the microphone 208, a sample of audio present in the media content listening area within the building while programming including media content for presentation to a listener of the media content in the media content listening area within the building is being output by a media player, such as receiving device 118; and remove from the received sample of audio, audio data associated with the programming being output to enable selection of an audio data sample from the plurality of audio data samples, based on comparison of the received sample of audio to the plurality of audio data samples, to use to cancel ambient white noise for the listener of the media content in the media content listening area within the building.

The logic 210 and audio analysis module 212 may also cause the mobile device 128 to store the plurality of audio data samples 214 and perform the selection of the audio data sample from the plurality of audio data samples 214 based on comparison of the received sample of audio to the plurality of audio data samples 214. The mobile device 128 may also communicate the selected audio data sample from the plurality of audio data samples 214 from the mobile device 128 to a media player device, such as the receiving device 118 to enable the media player device to play the selected audio data sample to cancel ambient white noise for the listener of the media content in the media content listening area while the programming is being output by the media player. In one embodiment, for each audio data sample, the audio analysis module 212 may compare one or more of: a time of day, a day of week, a week of month, a time of month, a week of year, a time of year and a day of year associated with the received sample of audio to a corresponding timeframe of when the audio data sample was collected to determine common characteristics between the received sample of audio and the baseline profile of the ambient white noise associated with the media content listening area represented by the audio data sample. The audio analysis module 212 may then select the audio data sample of the plurality of received audio data samples to cancel ambient white noise for the listener of the media content in the media content listening area based on the comparison and determined common characteristics.

In some embodiments, the selection of the audio data sample from the plurality of audio data samples may instead or also be performed by a logic and audio analysis module of the receiving device 118. For example, the mobile device 128 may communicate the plurality of audio data samples to a media player device, such as receiving device 118, and also communicate the sample of audio present in the media content listening area to enable the media player device to perform the comparison and the selection of the audio data sample from the plurality of audio data samples, based on comparison, for the media player device to cancel ambient white noise for the listener of the media content in the media content listening area.

In various embodiments, the mobile device 128 and/or receiving device 118 may: receive, from a microphone, such as microphone 208, a sample of audio present in a media content listening area within a building while programming including media content for presentation to a listener of the media content in the media content listening area within the building is being output by a media player. For each audio data sample of a plurality of audio data samples, the mobile device 128 and/or receiving device 118 may compare the received sample of audio to a baseline profile of ambient white noise associated with the media content listening area within the building represented by the audio data sample, to determine common characteristics between the received sample of audio and the baseline profile of the ambient white noise associated with the media content listening area within the building represented by the audio data sample. The mobile device 128 and/or receiving device 118 may then select an audio data sample of the plurality of received audio data samples to cancel ambient white noise for a listener of the media content in the media content listening area within the building based on the comparison and determined common characteristics.

In one embodiments, a plurality of audio data samples each representing a different baseline profile of ambient white noise associated with the media content listening area may be generated by the mobile device 128 and/or receiving device 118 for different devices, such as home appliances, that are not on all the time, and thus are not generating noise all the time. The user may select which audio data sample to use when playing an event or allow the mobile device 128 and/or receiving device 118 to check (i.e., automatically poll) the audio in the room or corresponding listening area at random or periodic intervals (e.g., in some cases, upon user approval) to automatically select the audio data sample with the baseline profile that is the closest match to the sample received from the automatic polling of the listening area. For example, if the mobile device 128 and/or receiving device 118 is set to automatically poll the listening area, the microphone 208 may take an audio sample, and the audio analysis module 212 then removes the known audio of the programming that the receiving device 118 is outputting at that time and then checks the remaining audio signal against the known baseline profiles of ambient white noise the mobile device 128 and/or receiving device 118 has for the listening area associated with the previously collected plurality of audio data samples. The receiving device 118 may then switch to using the previously collected audio data sample having the closest matching baseline profile of ambient white noise to cancel out most or all of the other sounds. In one embodiment, the audio analysis module 212 determines a closest match between the sample of audio present in the media content listening area and the plurality of audio data samples each representing a different baseline profile of ambient white noise associated with the media content listening area.

The mobile device 128 and/or receiving device 118 may then select the determined closest match as the selected audio data sample of the plurality of received audio data samples to cancel ambient white noise for the listener of the media content in the media content listening area within the building. Such analysis may instead or also be performed by the audio sample analysis server 122 and communicated in real time to the mobile device 128 and/or receiving device 118.

In at least some embodiments, remote and/or programmatic access is provided to at least some of the functionality of the mobile device 128 and/or receiving device 118. For example, the mobile device 128 and/or receiving device 118 may provide to other devices an application program interface ("API") that provides access to various functions of the mobile device 128 and/or receiving device 118, including access to information stored by the mobile device 128 and/or receiving device 118 (e.g., about other media devices) and different baseline profiles of ambient white noise associated with one or more media content listening areas or appliances. In this manner, the API may facilitate the development of third-party software, such as user interfaces, plug-ins, adapters and the like, such as for integrating functions of the mobile device 128 and/or receiving device 118 into various user interface applications on media devices and various desktop or mobile device applications. For example, a particular mobile device application may present a graphical display showing an indication of available audio data samples to select to cancel ambient white noise for the listener of the media content in the media content listening area. Also, a particular mobile device application may present a graphical display showing an indication of which audio data sample has been selected and/or is currently being used to cancel ambient white noise for the listener of the media content in the media content listening area. In some embodiments, a particular mobile device application may present a customized or different user interface based upon the functionality and capabilities of the mobile device 128 and/or the receiving device 118.

In an example embodiment, the logic 210 and audio analysis module 212 are implemented using standard programming techniques. For example, the logic 210 and audio analysis module 212 may be implemented as a "native" executable running on the CPU 203, along with one or more static or dynamic libraries. In other embodiments, the logic 210 and audio analysis module 212 may be implemented as instructions processed by a virtual machine that executes as some other program. In general, a range of programming languages known in the art may be employed for implementing such example embodiments, including representative implementations of various programming language paradigms and platforms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The embodiments described above may also use well-known or synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the mobile device 128.

In addition, programming interfaces to the data stored as part of the device information 211, can be available by standard mechanisms such as through C, C++, C #, and Java APIs; libraries for accessing files, databases, or other data repositories; through scripting languages such as JavaScript and VBScript; or through Web servers, FTP servers, or other types of servers providing access to stored data. The device information 211 and audio data samples 214 (which may include collected audio data, mobile device information, data representing receiving device software and/or firmware updates and receiving device information) may be implemented as one or more database systems, file systems, or any other technique for storing such information, or any combination of the above, including, in some embodiments, implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the mobile device 128.

Furthermore, in some embodiments, some or all of the components/portions of the logic 210 and audio analysis module 212 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

Some or all of the components, modules and functionality of the mobile device 128 described herein may also or instead be included as part of, and/or be performed by, the receiving device 118. For example, the components and functionality of the mobile device 128 associated with the collection and analysis of audio samples for noise cancelation may be included as part of and/or be performed by the receiving device 118. In one embodiment, the receiving device 118 may include one or more CPUs coupled to one or more memory devices that store computer executable instructions that, when executed by the one or more CPUs that cause the receiving device 118 to perform the techniques described herein. For example, the computer executable instructions, when executed by one or more CPUs may cause the receiving device 118 to receive (e.g., from the mobile device 128) a plurality of audio data samples each representing a different baseline profile of ambient white noise associated with a media content listening area within a building; after receiving the plurality of audio data samples each representing a different baseline profile of ambient white noise, output programming including media content for presentation to a listener of the media content in the media content listening area within the building; and output while outputting the programming, an audio signal based on a selected audio data sample of the plurality of received audio data samples to cancel ambient white noise for the listener of the media content in the media content listening area.

Figure 3:
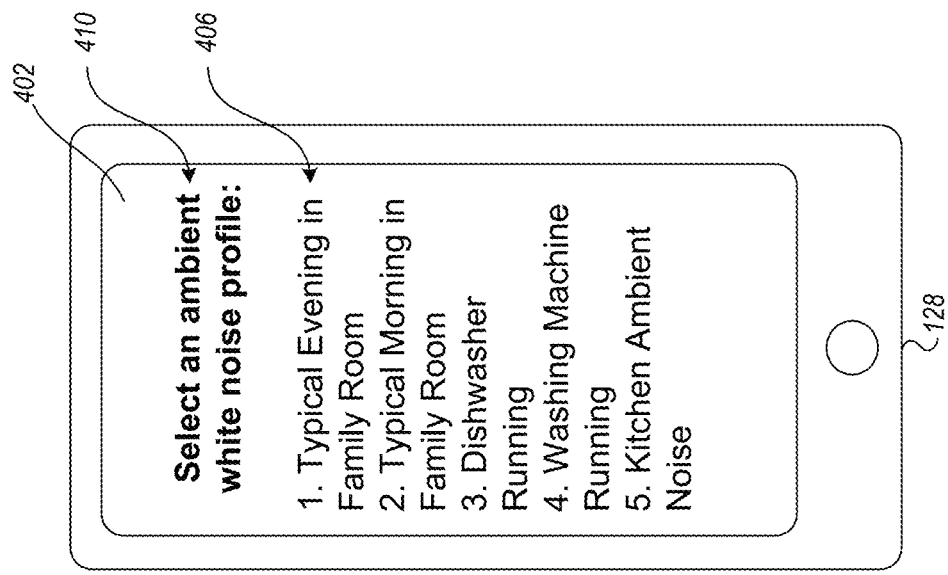
FIG. 3 is a diagram of an example handheld mobile device illustrating an example user interface screen shown in an example process for noise cancelation, according to an example embodiment.

FIG. 3 is a diagram of an example handheld mobile device 128 illustrating an example user interface screen 402 shown in an example process for noise cancelation, according to an example embodiment.

A mobile device application of mobile device 128 may present a graphical display on user interface screen 402 showing an indication of available audio data samples 406 from which to select to cancel ambient white noise for the listener of the media content in the media content listening area. Also shown is a prompt 410 to prompt the user to select an available audio data samples from the indication of available audio data samples 406. Each of the available audio data samples 406 may be associated with a different baseline profile of ambient white noise associated with a particular media content listening area, a particular appliance, and/or a particular time of day. The particular media content listening area, particular appliance(s), the particular time of day, and/or other descriptive or identifiable characteristics may be automatically associated with the collected audio sample by the mobile device 128 based on location data (e.g., global positioning system (GPS) and/or triangulated location information) and clock and calendar data of the mobile device 128, or the user may tag the audio sample with such metadata. In the example shown in FIG. 3, available audio data samples 406 are labeled according to which baseline profile of ambient white noise it is associated. In particular, the example available audio data samples 406 shown in FIG. 3 include "1. Typical Evening in Family Room", "2. Typical Morning in Family Room", "3. Dishwasher Running", "4. Washing Machine Running", and "5. Kitchen Ambient Noise". The user may then select which audio data sample to use to cancel ambient white noise according to which listening area the user is in (e.g., kitchen, family room, etc.) time of day (e.g., evening, morning, etc.) or other characteristics.

Figure 4:
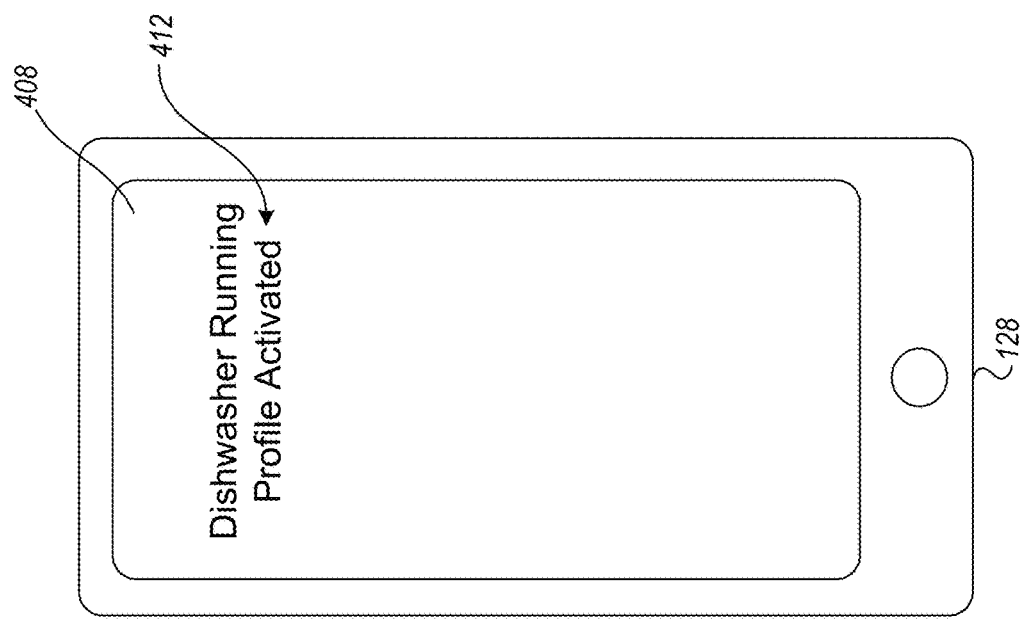
FIG. 4 is a diagram of an example handheld mobile device illustrating another example user interface screen shown in an example process for noise cancelation, according to an example embodiment.

FIG. 4 is a diagram of the example handheld mobile device 128 of FIG. 3 illustrating another example user interface screen 408 shown in an example process for noise cancelation, according to an example embodiment.

As shown in FIG. 4, the application of the mobile device 128 presents a graphical display showing an indication of which audio data sample has been selected and/or is currently being used to cancel ambient white noise for the listener of the media content in the media content listening area. In the example, shown on the user interface screen 408 is an indication 412 that the "Dishwasher Running" profile has been activated. This activation may have been caused by user selection of the "Dishwasher Running" audio data sample associated with a baseline profile of ambient white noise of the dishwasher (e.g., because the dishwasher was running when the user wanted to listen to the programming) or by automatic selection of an audio data sample of the plurality of received audio data samples to cancel ambient white noise for the listener of the media content based on the comparison of previously collected audio samples and determined common characteristics. For example, the mobile device 128 may have collected an audio sample while the dishwasher was running, which was thus labeled "Dishwasher Running" by the user or the mobile device 128. The mobile device 128 may have then polled a listening area, using microphone 208, which is exposed to audio of the dishwasher at a later time while the dishwasher was running and then automatically determined to select the "Dishwasher Running" audio data sample of the plurality of received audio data samples in order to cancel ambient white noise of the dishwasher in the media content listening area.

Figure 5:
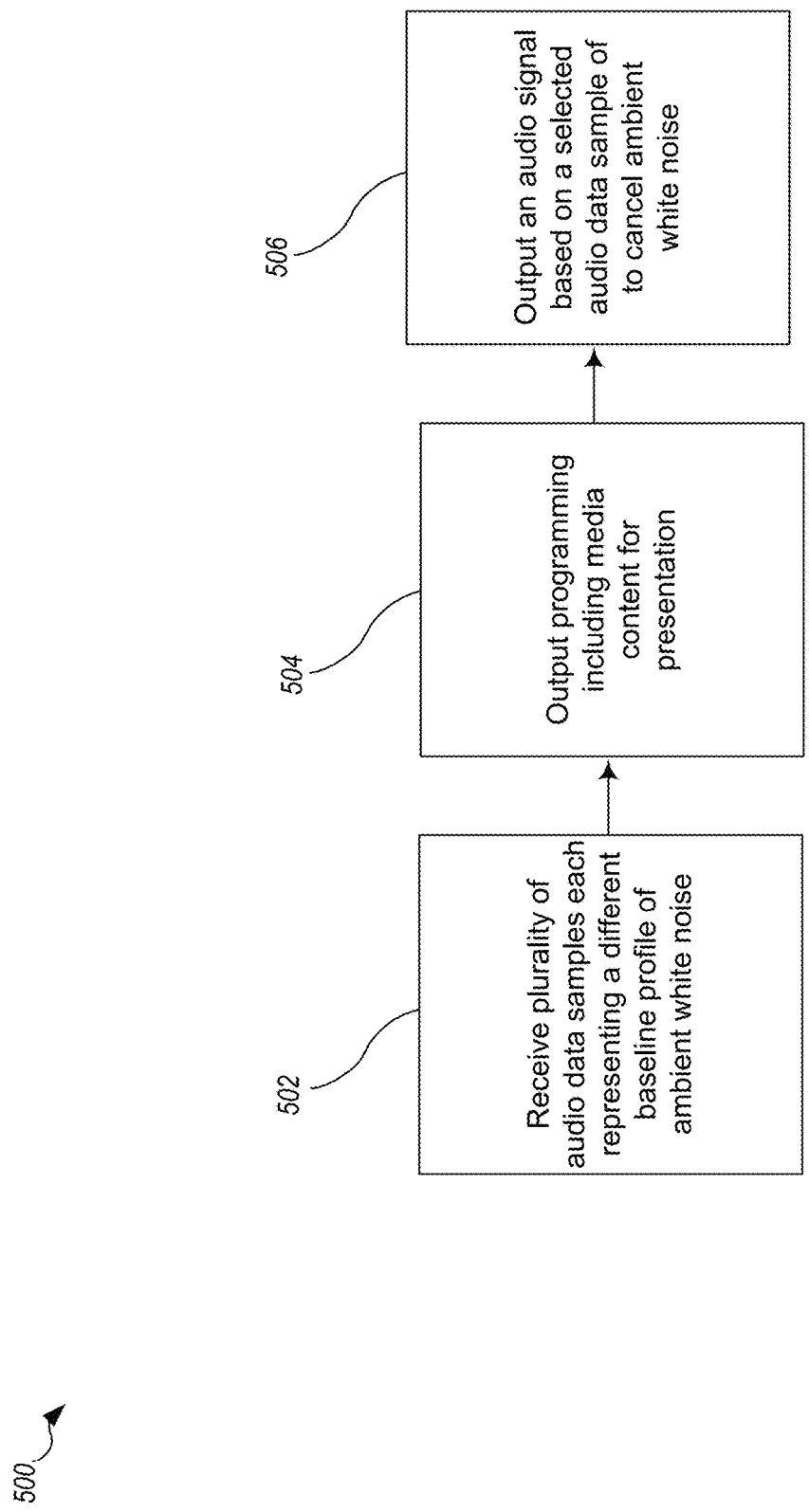
FIG. 5 is a flow diagram of an example method for noise cancelation, according to an example embodiment.

FIG. 5 is a flow diagram of an example method 500 for noise cancelation, according to an example embodiment.

At 502, the system receives a plurality of audio data samples each representing a different baseline profile of ambient white noise associated with a media content listening area within a building. The system may include one or more devices shown in the environment 102 of FIG. 1, operating individually or together, that may perform the functionality of the techniques of noise cancelation described herein.

At 504, the system, after receiving the plurality of audio data samples each representing a different baseline profile of ambient white noise, outputs programming including media content for presentation to a listener of the media content in the media content listening area within the building.

At 506, the system, outputs, while outputting the programming, an audio signal based on a selected audio data sample of the plurality of received audio data samples to cancel ambient white noise for the listener of the media content in the media content listening area within the building.

Figure 6:
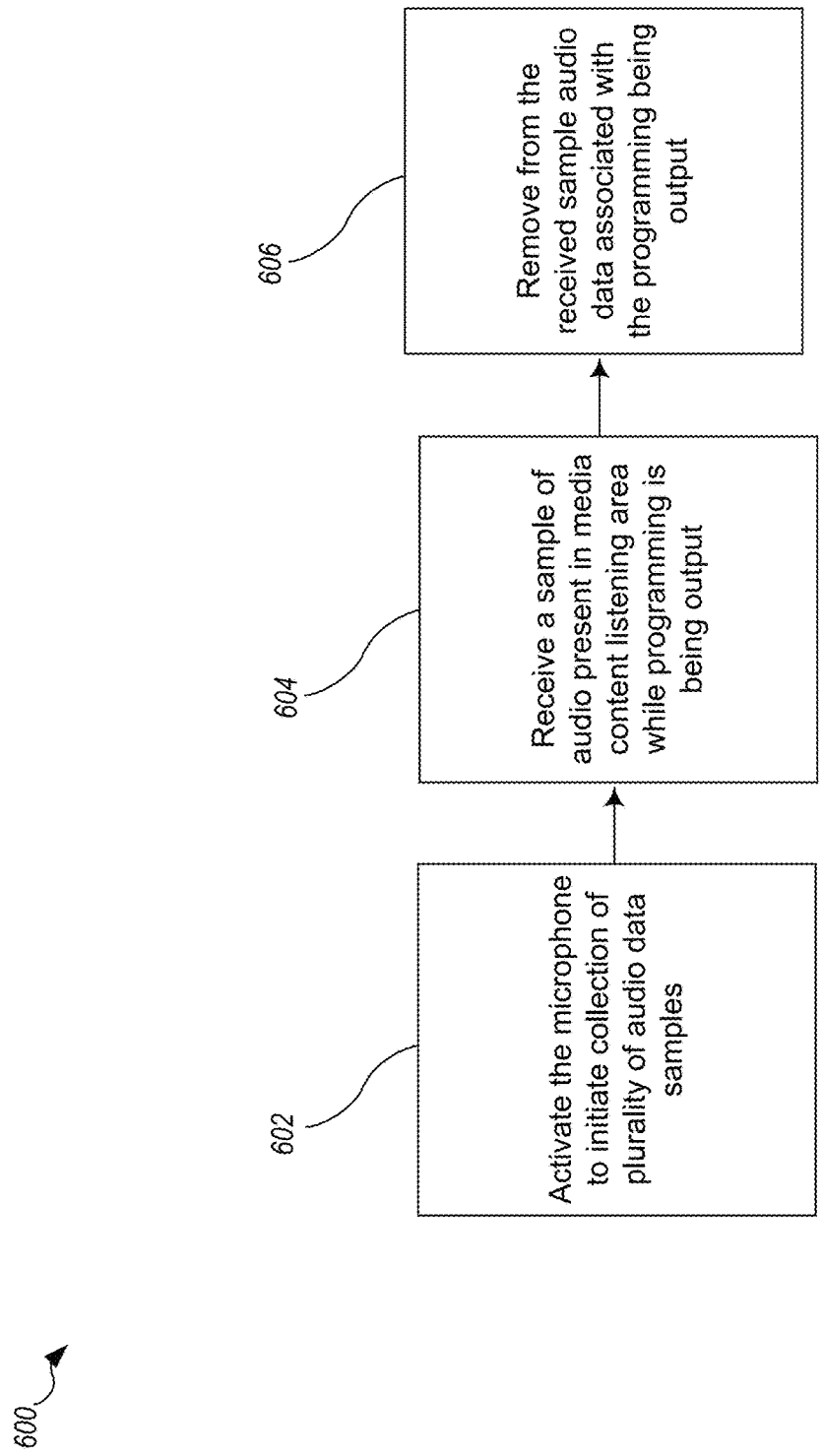
FIG. 6 is a flow diagram of an example method for removing audio from a received sample useful in noise cancelation, according to an example embodiment.

FIG. 6 is a flow diagram of an example method 600 for removing audio from a received sample useful in noise cancelation, according to an example embodiment.

At 602, the system activates a microphone to initiate collection of a plurality of audio data samples as samples of audio present in a media content listening area within a building, each audio data sample of the plurality of audio data samples representing a different baseline profile of ambient white noise associated with the media content listening area within the building.

At 604, the system receives, from the microphone, a sample of audio present in the media content listening area within the building while programming including media content for presentation to a listener of the media content in the media content listening area within the building is being output by a media player.

At 606, the system removes from the received sample of audio, audio data associated with the programming being output to enable selection of an audio data sample from the plurality of audio data samples, based on comparison of the received sample of audio to the plurality of audio data samples, to use to cancel ambient white noise for the listener of the media content in the media content listening area within the building.

Figure 7:
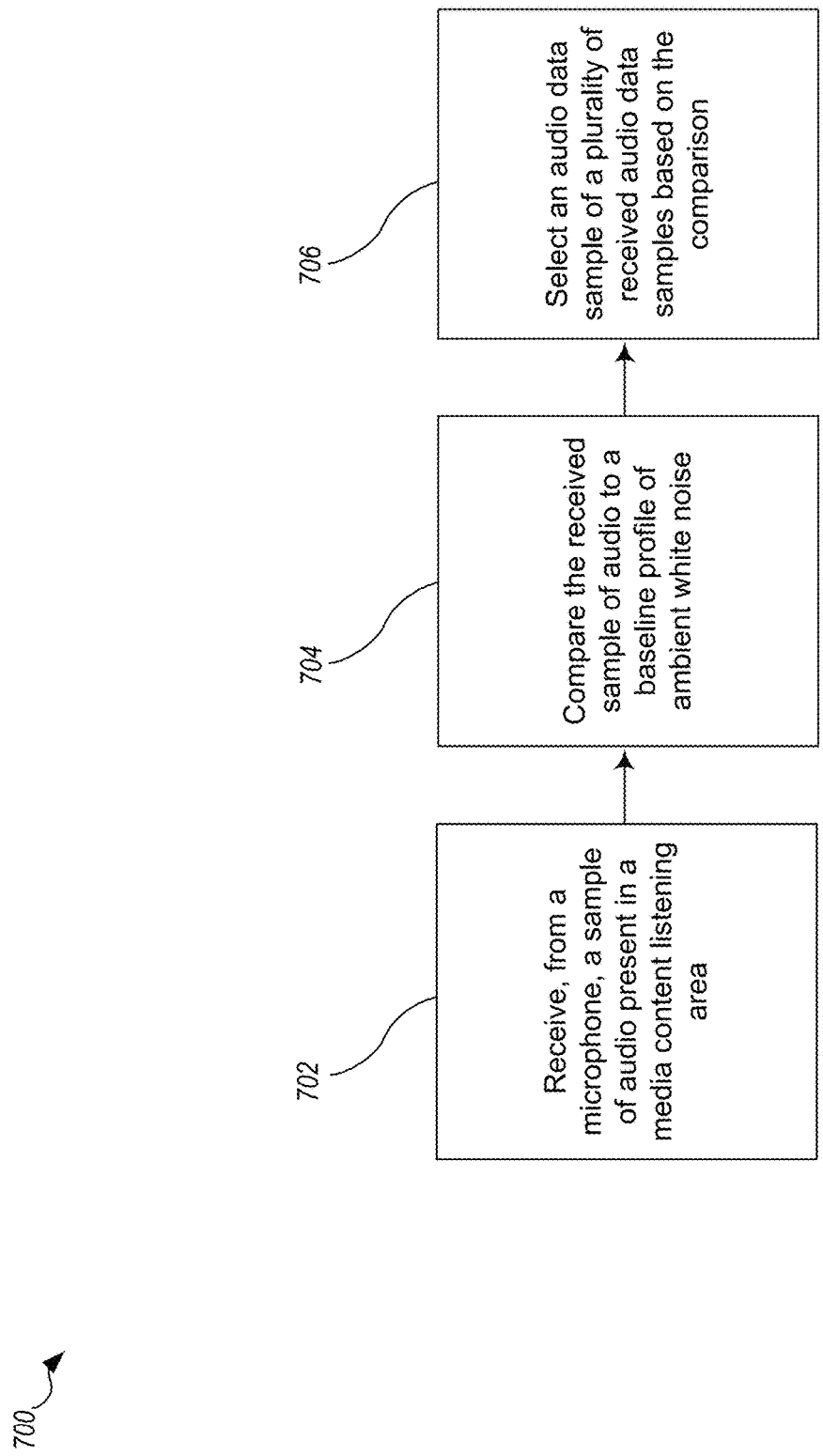
FIG. 7 is a flow diagram of an example method for selecting an audio data sample useful in noise cancelation, according to an example embodiment.

FIG. 7 is a flow diagram of an example method 700 for selecting an audio data sample useful in noise cancelation, according to an example embodiment.

At 702, the system receives, from a microphone, a sample of audio present in a media content listening area within a building while programming including media content for presentation to a listener of the media content in the media content listening area within the building is being output by a media player.

At 704, the system, for each audio data sample of a plurality of audio data samples, compares the received sample of audio to a baseline profile of ambient white noise associated with the media content listening area within the building represented by the audio data sample, to determine common characteristics between the received sample of audio and the baseline profile of the ambient white noise associated with the media content listening area within the building represented by the audio data sample.

At 706, the system, selects an audio data sample of the plurality of received audio data samples to cancel ambient white noise for a listener of the media content in the media content listening area within the building based on the comparison and determined common characteristics.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for noise cancelation, comprising:
    receiving, by at least one computer processor, a plurality of audio data samples each representing a different baseline profile of ambient white noise associated with a media content listening area within a building;
    after receiving the plurality of audio data samples each representing a different baseline profile of ambient white noise, outputting, by the at least one computer processor, programming including media content for presentation to a listener of the media content in the media content listening area within the building;
    outputting, by the at least one computer processor, while outputting the programming, an audio signal based on a selected audio data sample of the plurality of received audio data samples to cancel ambient white noise for the listener of the media content in the media content listening area within the building; and
    selecting, by the at least one computer processor, the selected audio data sample of the plurality of received audio data samples to cancel ambient white noise for the listener of the media content in the media content listening area within the building, wherein the selecting the selected audio data sample of the plurality of received audio data samples to cancel ambient white noise for the listener of the media content in the media content listening area within the building includes:
        receiving, from a microphone, a sample of audio present in the media content listening area within the building;
        for each audio data sample of the plurality of audio data samples, comparing the received sample of audio to the baseline profile of the ambient white noise associated with the media content listening area within the building represented by the audio data sample to determine common characteristics between the received sample of audio and the baseline profile of the ambient white noise associated with the media content listening area within the building represented by the audio data sample; and
        selecting the selected audio data sample of the plurality of received audio data samples to cancel ambient white noise for the listener of the media content in the media content listening area within the building based on the comparison and determined common characteristics.

2. The method of claim 1 further comprising:
    before the comparing the received sample of audio to the baseline profile of the ambient white noise, removing from the received sample of audio, audio data associated with the programming being output.

3. A method for noise cancelation, comprising:
    receiving, by at least one computer processor, a plurality of audio data samples each representing a different baseline profile of ambient white noise associated with a media content listening area within a building;
    after receiving the plurality of audio data samples each representing a different baseline profile of ambient white noise, outputting, by the at least one computer processor, programming including media content for presentation to a listener of the media content in the media content listening area within the building;
    outputting, by the at least one computer processor, while outputting the programming, an audio signal based on a selected audio data sample of the plurality of received audio data samples to cancel ambient white noise for the listener of the media content in the media content listening area within the building; and
    selecting, by the at least one computer processor, the selected audio data sample of the plurality of received audio data samples to cancel ambient white noise for the listener of the media content in the media content listening area within the building, wherein the selecting the selected audio data sample of the plurality of received audio data samples to cancel ambient white noise for the listener of the media content in the media content listening area within the building includes:
        determining a closest match between a sample of audio present in the media content listening area within the building and the plurality of audio data samples each representing a different baseline profile of ambient white noise associated with the media content listening area within the building; and
        selecting the determined closest match as the selected audio data sample of the plurality of received audio data samples to cancel ambient white noise for the listener of the media content in the media content listening area within the building.

4. A method for noise cancelation, comprising:
- receiving, by at least one computer processor, a plurality of audio data samples each representing a different baseline profile of ambient white noise associated with a media content listening area within a building;
- after receiving the plurality of audio data samples each representing a different baseline profile of ambient white noise, outputting, by the at least one computer processor, programming including media content for presentation to a listener of the media content in the media content listening area within the building;
- outputting, by the at least one computer processor, while outputting the programming, an audio signal based on a selected audio data sample of the plurality of received audio data samples to cancel ambient white noise for the listener of the media content in the media content listening area within the building; and
- selecting, by the at least one computer processor, the selected audio data sample of the plurality of received audio data samples to cancel ambient white noise for the listener of the media content in the media content listening area within the building, wherein the selecting the selected audio data sample of the plurality of received audio data samples to cancel ambient white noise for the listener of the media content in the media content listening area within the building includes:
  - generating, by at least one computer processor, a menu of the plurality of received audio data samples from which the listener may select to cancel ambient white noise for the listener of the media content in the media content listening area within the building;
  - receiving, by at least one computer processor, input indicative of a selection by the listener of a selected audio data sample from the menu of the plurality of received audio data samples; and
  - in response to receiving the input indicate of the selection, selecting the selected audio data sample from the menu of the plurality of received audio data samples as the selected audio data sample of the plurality of received audio data samples to cancel ambient white noise for the listener of the media content in the media content listening area within the building.

5. A method for noise cancelation, comprising:
- receiving, by at least one computer processor, a plurality of audio data samples each representing a different baseline profile of ambient white noise associated with a media content listening area within a building;
- after receiving the plurality of audio data samples each representing a different baseline profile of ambient white noise, outputting, by the at least one computer processor, programming including media content for presentation to a listener of the media content in the media content listening area within the building;
- outputting, by the at least one computer processor, while outputting the programming, an audio signal based on a selected audio data sample of the plurality of received audio data samples to cancel ambient white noise for the listener of the media content in the media content listening area within the building; and
- selecting, by the at least one computer processor, the selected audio data sample of the plurality of received audio data samples to cancel ambient white noise for the listener of the media content in the media content listening area within the building, wherein the selecting the selected audio data sample of the plurality of received audio data samples to cancel ambient white noise for the listener of the media content in the media content listening area within the building includes:
  - receiving, from a microphone, a sample of audio present in the media content listening area within the building;
  - for each audio data sample of the plurality of audio data samples, comparing one or more of: a time of day, a day of week, a week of month, a time of month, a week of year, a time of year and a day of year associated with the received sample of audio to a corresponding timeframe of when the audio data sample was collected to determine common characteristics between the received sample of audio and the baseline profile of the ambient white noise associated with the media content listening area within the building represented by the audio data sample; and
  - selecting the selected audio data sample of the plurality of received audio data samples to cancel ambient white noise for the listener of the media content in the media content listening area within the building based on the comparison and determined common characteristics.

6. The method of claim 5 wherein the at least one computer processor is at least one computer processor of a television receiving device.

7. The method of claim 5 wherein the receiving the plurality of audio data samples each representing a different baseline profile of ambient white noise associated with a media content listening area within a building includes:
- activating a microphone to initiate collection of the plurality of audio data samples as samples of audio present in the media content listening area within the building.

8. A method for noise cancelation, comprising:
- receiving, by at least one computer processor, a plurality of audio data samples each representing a different baseline profile of ambient white noise associated with a media content listening area within a building;
- after receiving the plurality of audio data samples each representing a different baseline profile of ambient white noise, outputting, by the at least one computer processor, programming including media content for presentation to a listener of the media content in the media content listening area within the building; and
- outputting, by the at least one computer processor, while outputting the programming, an audio signal based on a selected audio data sample of the plurality of received audio data samples to cancel ambient white noise for the listener of the media content in the media content listening area within the building, wherein the receiving the plurality of audio data samples each representing a different baseline profile of ambient white noise associated with a media content listening area within a building includes:
  - activating a microphone to initiate collection of the plurality of audio data samples as samples of audio present in the media content listening area within the building including activating the microphone to initiate collection of the plurality of audio data samples on a periodic basis based on one or more of: time of day, day of week, week of month, time of month, week of year, time of year and day of year, in order to determine the selected audio data sample by, for each audio data sample of the plurality of audio data samples, determining common characteristics between a received sample of audio and the baseline profile of the ambient white noise associated with the media content listening area within the building represented by the audio data sample.

9. A method for noise cancelation, comprising:
receiving, by at least one computer processor, a plurality of audio data samples each representing a different baseline profile of ambient white noise associated with a media content listening area within a building;
after receiving the plurality of audio data samples each representing a different baseline profile of ambient white noise, outputting, by the at least one computer processor, programming including media content for presentation to a listener of the media content in the media content listening area within the building; and
outputting, by the at least one computer processor, while outputting the programming, an audio signal based on a selected audio data sample of the plurality of received audio data samples to cancel ambient white noise for the listener of the media content in the media content listening area within the building, wherein the receiving the plurality of audio data samples each representing a different baseline profile of ambient white noise associated with a media content listening area within a building includes:
activating a microphone to initiate collection of the plurality of audio data samples as samples of audio present in the media content listening area within the building including activating the microphone to initiate collection of the plurality of audio data samples at random intervals and recording one or more of: time of day, day of week, week of month, time of month, week of year, time of year and day of year, at which each of the plurality of audio data samples was collected in order to determine the selected audio data sample by, for each audio data sample of the plurality of audio data samples, determining common characteristics between a received sample of audio and the baseline profile of the ambient white noise associated with the media content listening area within the building represented by the audio data sample.

10. A remote control device for a media player device comprising:
at least one processor;
a microphone coupled to the at least one processor; and
at least one memory coupled to the at least one processor, the at least one memory having computer-executable instructions stored thereon that, when executed by the at least one processor, cause the at least one processor to:
activate the microphone to initiate collection of a plurality of audio data samples as samples of audio present in a media content listening area within a building, each audio data sample of the plurality of audio data samples representing a different baseline profile of ambient white noise associated with the media content listening area within the building;
store the plurality of audio data samples;
receive, from the microphone, a sample of audio present in the media content listening area within the building while programming including media content for presentation to a listener of the media content in the media content listening area within the building is being output by a media player;
perform comparison of the received sample of audio to the plurality of audio data samples;
remove from the received sample of audio, audio data associated with the programming being output to enable selection of an audio data sample from the plurality of audio data samples, based on comparison of the received sample of audio to the plurality of audio data samples, to use to cancel ambient white noise for the listener of the media content in the media content listening area within the building; and
perform the selection of the audio data sample from the plurality of audio data samples based on comparison of the received sample of audio to the plurality of audio data samples;
communicate the selected audio data sample from the plurality of audio data samples from the remote control device to the media player device to enable the media player device to play the selected audio data sample to cancel ambient white noise for the listener of the media content in the media content listening area within the building while the programming is being output by the media player.

11. The remote control device of claim 10 wherein the computer-executable instructions, when executed by the at least one processor, further cause the at least one processor to:
communicate the plurality of audio data samples to the media player device; and
communicate the sample of audio present in the media content listening area within the building to enable the media player device to perform the comparison and the selection of the audio data sample from the plurality of audio data samples, based on the comparison, for the media player device to cancel ambient white noise for the listener of the media content in the media content listening area within the building.

12. The remote control device of claim 10 wherein the at least one processor is at least one processor of a smartphone and the at least one memory is at least one memory of a smartphone.

13. A non-transitory computer readable storage medium having computer executable instructions thereon that, when executed by at least one computer processor, cause the at least one computer processor to cause a noise canceling system to:
receive, from a microphone, a sample of audio present in a media content listening area within a building while programming including media content for presentation to a listener of the media content in the media content listening area within the building is being output by a media player;
for each audio data sample of a plurality of audio data samples, compare the received sample of audio to a baseline profile of ambient white noise associated with the media content listening area within the building represented by the audio data sample, to determine common characteristics between the received sample of audio and the baseline profile of the ambient white noise associated with the media content listening area within the building represented by the audio data sample; and
select an audio data sample of the plurality of received audio data samples to cancel ambient white noise for a listener of the media content in the media content listening area within the building based on the comparison and determined common characteristics.

14. The non-transitory computer readable storage medium of claim 13 wherein the computer-executable instructions, when executed by the at least one processor, further cause the at least one processor to:

before the comparing the received sample of audio to the baseline profile of the ambient white noise, remove from the received sample of audio, audio data associated with the programming being output.

15. The non-transitory computer readable storage medium of claim 13 wherein the selecting audio data sample of the plurality of received audio data samples to cancel ambient white noise for the listener of the media content in the media content listening area within the building includes:
- determining a closest match between the sample of audio present in the media content listening area within the building and the plurality of audio data samples each representing a different baseline profile of ambient white noise associated with the media content listening area within the building; and
- selecting the determined closest match as the selected audio data sample of the plurality of received audio data samples to cancel ambient white noise for the listener of the media content in the media content listening area within the building.

16. The non-transitory computer readable storage medium of claim 13 wherein the selecting an audio data sample of the plurality of received audio data samples to cancel ambient white noise for the listener of the media content in the media content listening area within the building includes:
- detecting within the sample of audio present in the media content listening area within the building, an audio profile a home appliance based on the comparison; and
- selecting the audio data sample of the plurality of received audio data samples to cancel ambient white noise by repeating of playing of the selected audio data sample, based on the detection of the audio profile the home appliance.

* * * * *